United States Patent [19]
Sainsbury et al.

[11] Patent Number: 6,104,162
[45] Date of Patent: Aug. 15, 2000

[54] METHOD AND APPARATUS FOR MULTI-POWER SOURCE FOR POWER TOOLS

[76] Inventors: Simon R. Sainsbury, 3285 Westland, Melbourne, Fla. 32934; Gürsel G. Yilmaz, 28202 Meadowlark La., Bonita Springs, Fla. 34134

[21] Appl. No.: 09/394,471

[22] Filed: Sep. 11, 1999

[51] Int. Cl.$^7$ ....................................................... H02J 7/02
[52] U.S. Cl. ........................................... 320/111; 320/107
[58] Field of Search .................................... 320/111, 107; 429/48, 99, 100

[56] References Cited

U.S. PATENT DOCUMENTS

| | | | |
|---|---|---|---|
| 5,354,215 | 10/1994 | Viracola ................................... | 320/114 |
| 5,510,691 | 4/1996 | Palatov .................................... | 320/111 |
| 5,554,896 | 9/1996 | Hogan ..................................... | 307/150 |
| 5,780,993 | 7/1998 | Tsang ....................................... | 320/111 |
| 5,929,597 | 7/1999 | Pfeifer et al. ........................... | 320/107 |
| 6,007,373 | 12/1999 | Chew ...................................... | 439/504 |

*Primary Examiner*—Peter S. Wong
*Assistant Examiner*—Lawrence Luk

[57] ABSTRACT

Method and apparatus for providing multi-power source for power tools. The apparatus includes (a) a multi-functional power block capable of being powered from multiple energy sources including, but not limited to, AC mains, DC power or fuel cell, and (b) a multi-functional battery module capable of receiving power from the multi-functional power block and fit into the recess in the tool which receives the power pack. The multi-functional power block includes an AC to DC converter, a voltage input selector, a DC to DC converter, an auto voltage selector, and a solid state power monitor which automatically sets the voltage and current to be delivered to power connectors integral to the multi-functional power block. The multi-functional battery module includes batteries, a battery charger which uses power from the multi-functional power block to recharge the battery, a power distributor, and a power monitor which monitors operation of the tool's motor so that the power distributor can automatically deliver the required voltage and current to the tool's motor from one or a combination of battery power and the multi-functional power block to produce the required operational driving torque. The apparatus also includes an AC mains plug and a first flexible line running from the AC mains plug to the multi-functional power block, a DC connector and a second flexible line running from the DC connector to the multi-functional power block, a third flexible line with attached DC plugs at both ends, and a series of adapters designed to fit into recesses in the multi-functional power block and in the tool.

9 Claims, 6 Drawing Sheets

METHOD AND APPARATUS FOR MULTI-POWER SOURCE FOR POWER TOOLS

FIELD OF THE INVENTION

Our invention lies in the field of power tools and more specifically to means for providing multi-power source, such as AC, DC or fuel cell power, for power such as battery powered tools.

BACKGROUND OF THE INVENTION

The flexibility and convenience of battery powered tools has led to remarkable growth in the number and operational range of battery powered tools such as drills, sanders, saws and routers. Purchasers of these tools, which are often sold in kits containing several different tools and multiple battery packs and a device for recharging exhausted or rundown battery packs, are motivated by the freedom that battery powered tools provide.

Despite their convenience, battery powered tools as presently marketed have a number of limitations. The increasing demand for power delivering capability of these battery powered tools has prompted physically larger, heavier, larger capacity battery packs. Despite the larger capacity battery packs, power demanding tool usage rapidly depletes the energy source requiring frequent battery pack changes and recharging. Equally important, the power tool's full rated torque is only achieved when the tool motor is fed full voltage and current and this torque is only achieved with a new fully charged battery and as a result the delivered torque of the battery powered tool decreases not only as the battery energy is depleted between charges, but also decreases by the number of battery charging cycles.

The charger device capability has also kept up with demand such that battery packs can be recharged in an hour or less. With heavy usage of a power demanding battery tool such as a saw or hammer drill, the user often must change and recharge the tool's battery packs within an hour or less usage time. Additionally, demanding usage of the battery packs causes excessive battery heat buildup requiring the packs to cool down before being recharged.

As a result, users of battery powered tools often purchase multiple battery packs and chargers and must work near a source of AC mains power for the chargers. Additionally, users purchase AC mains powered tools to supplement their battery powered tools during periods of battery recharging and when the job requires a tool with constant full torque.

SUMMARY OF THE INVENTION

Our invention provides a method and apparatus for enhancing the usefulness of power tools such as battery powered tools. Briefly put, when the tool is used where an external source of energy is available, our invention permits the tool's power pack to be supplemented from multiple energy sources including, but not limited to, AC mains, DC power or fuel cell power. This has the advantage of a tool which can be used while recharging its batteries. Additionally during demanding power tool usage that require the tool to be operated up to full rated driving torque, energy from the battery supplements energy from the external energy source and then the batteries are recharged during less demanding tool usage and idle time. In this manner the tool, the apparatus, cabling, power source, and batteries can be optimized for material, weight, physical size, torque and power properties.

The apparatus includes (a) a multi-functional power block capable of being powered from multiple energy sources including, but not limited to, AC mains, DC power or fuel cell, and (b) a multi-functional battery module capable of receiving power from the multi-functional power block and fit into the recess in the tool which receives the power pack. The multi-functional power block includes an AC to DC converter, a voltage input selector, a DC to DC converter, an auto voltage selector, and a solid state power monitor which automatically sets the voltage and current to be delivered to power connectors integral to the multi-functional power block. The multi-functional battery module includes batteries, a battery charger which uses power from the multi-functional power block to recharge the battery, a power distributor, and a power monitor which monitors operation of the tool's motor so that the power distributor can automatically deliver the required voltage and current to the tool's motor from one or a combination of battery power and the multi-functional power block to produce the required operational driving torque. The apparatus also includes an AC mains plug and a first flexible line running from the AC mains plug to the multi-functional power block, a DC connector and a second flexible line running from the DC connector to the multi-functional power block, a third flexible line with attached DC plugs at both ends, and a series of adapters designed to fit into recesses in the multi-functional power block and in the tool.

The multi-functional battery module, sized to fit into the recess in the tool normally filled by its power pack, provides energy to the tool's motor from one or a combination of battery and multi-functional power block as needed to produce the required operational driving torque. During demanding power tool usage, energy from the battery supplements energy from the multi-functional power block. The battery is then recharged during less demanding tool usage and idle time. In this manner, the multi-functional power block, cabling, power source, and batteries can be optimized for material, weight and physical size properties.

Due to the different sizes and shapes of the battery packs used by different power tool manufacturers, we have devised several different shapes of our multi-functional battery module, and additionally, several different shapes of adapters for both the charging recess in the multi-functional power block and the recess in the tool.

Use of our multi power source provides several benefits;
(a) will reduce capacity requirements for the tool's battery packs thereby reducing the physical size, weight, and battery material,
(b) reduces frequent battery pack changes and recharging during power demanding tool usage,
(c) charges the multi-functional battery module, or battery pack with adapter, in the tool during tool use and at idle so that the battery energy remains high and the tool can deliver full operational driving torque when required,
(d) charges an additional multi-functional battery module, or battery pack with adapter, in the multi-functional power block,
(e) permits the use of generic battery packs coupled with adapters to match the different sizes, shapes, voltage and energy capacity of battery packs used by different power tool manufacturers,
(f) decreases use of battery energy which will extend the rechargeable life of the batteries also creating less environmental problems caused by disposal of unusable batteries,
(g) reduces the requirement for purchasing additional chargers and multiple battery packs due to demanding battery pack usage, charging, and heat buildup.

The components of our invention may be included with a kit of several different battery powered tools or the components sold separately for use with one or more battery powered tools.

DETAILED DESCRIPTION OF THE PREFERRED EMBODIMENT

Figure 1:
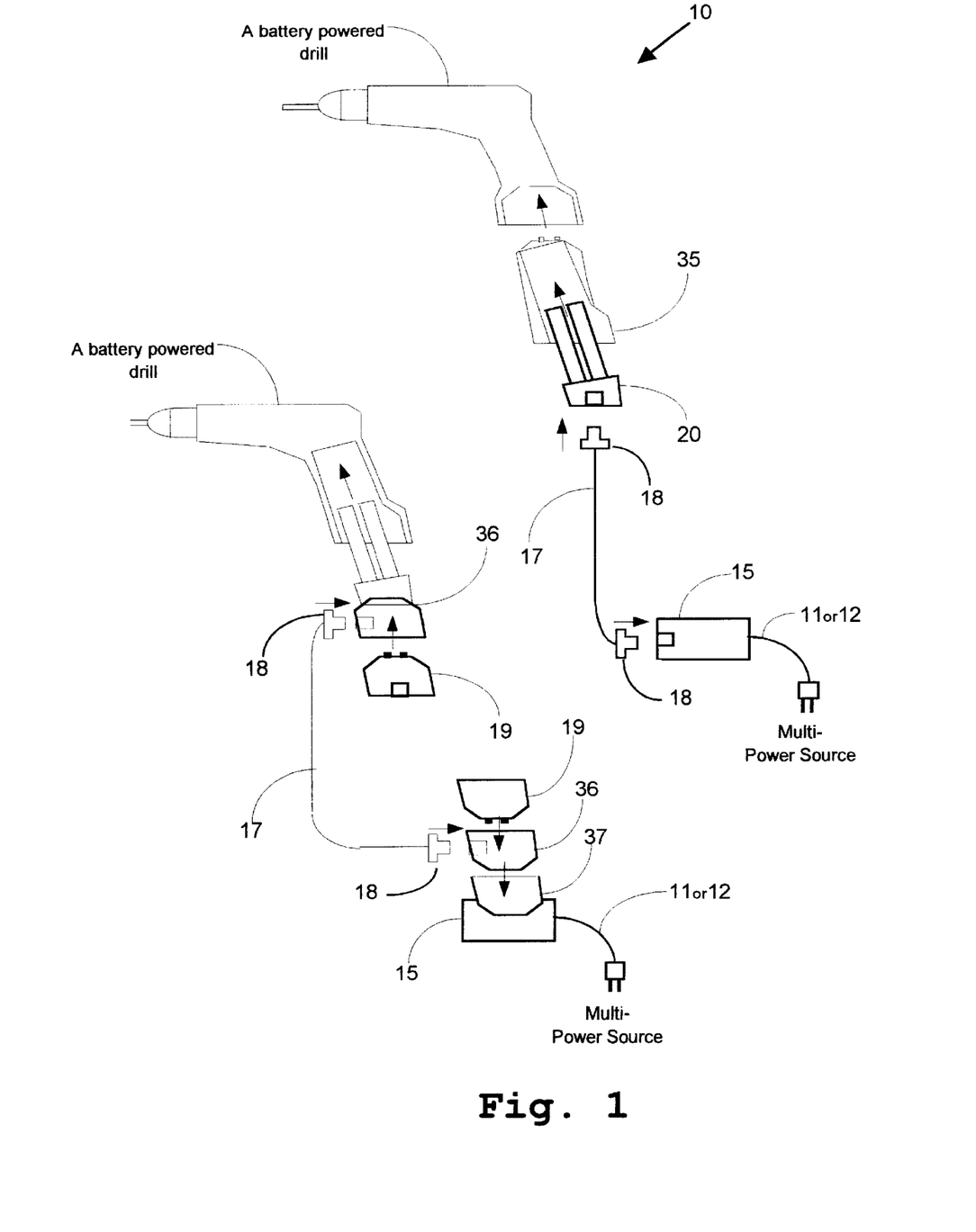
FIG. 1 is a pictorial description showing the components of our invention and their connection to a battery powered tool including multifunctional power block and adapter.
Figure 2:
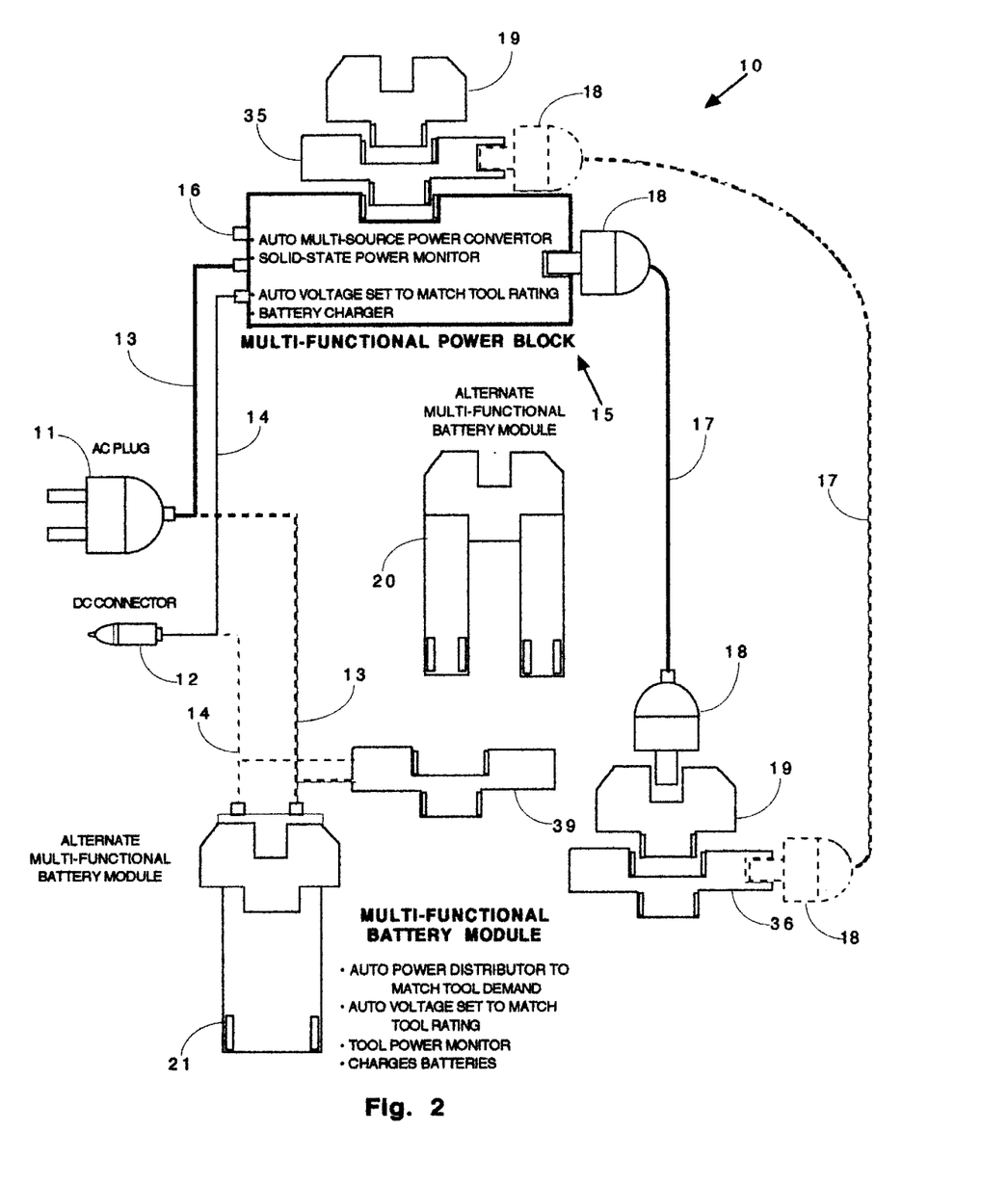
FIG. 2 is a pictorial description showing the components of our invention including multifunctional power block comprising a battery charger and power convertor and also shows multifunctional battery module and adapters.

FIGS. 1 and 2 illustrate our device 10 for providing multi-power source for power tools such as battery powered tools. AC mains power is fed to device 10 from AC cord plug 11 and flexible line 13 to the multi-functional power block 15. In the event AC power is not available, DC power can be used from any DC power source such as the cigarette lighter receptacle on an automobile, motor home or tractor. DC power is fed to device 10 from DC connector 12 and fed through flexible line 14 to the multi-functional power block 15. Other power sources can be fed to device 10 either by converting the energy to AC or DC power, or alternatively, by additional power connectors and flexible lines.

Electric power having the correct voltage and current selected by multi-functional power block 15 is fed through flexible electric line 17, with an integral DC plug 18, with a finger release lock, fitted at both ends of 17, to multi-functional battery module 19. The first plug 18 is fitted into a receiving socket on the multi-functional power block 15 and the second plug 18 is fitted into a multi-functional battery module 19 sized to fit into the recess in the tool normally filled by its battery pack. Two different forms of the multi-functional battery module 19 and 20 are illustrated in FIGS. 1 and 2.

Alternatively, electric power having the correct voltage and current selected by multi-functional power block 15 can be fed to the tool through flexible electric line 17 connected to adapters 35 and 36 both with finger release locks. The first plug 18 is fitted into a receiving socket on adapter 35 and the second plug 18 is fitted into a receiving socket on adapter 36. Adapter 35 is sized to fit into the charging recess in the multi-functional power block and has a recess sized to accept a power pack or multi-functional battery module. Adapter 36 is sized to fit into the recess in the tool normally filled by its power pack, and has a recess sized to accept a power pack or multi-functional battery module. Both adapters 35 and 36 could be identical in shape and function and can recharge the power pack or multi-functional battery module 19 inserted into the adapter.

Alternatively, electric power having the correct voltage and current selected by multi-functional power block 15 can be fed to the multi-functional battery module 19 and/or tool through flexible electric line 17 using a number of possible combinations of receiving sockets, e.g. connecting the first plug 18 to any one of the receiving sockets on either the multi-functional power block or adapter 35 and then connecting the second plug 18 to any one of the receiving sockets on either the multi-functional battery module or adapter 36.

Alternatively if it is desired to use our device 10 to power a multi-power source multi-functional battery module directly insertable into a battery powered tool, the alternate multi-power source multi-functional battery module 21 is connectable to either AC cord plug 11 or DC cord plug 12 as shown in FIG. 2. Other power sources can be fed to multi-functional battery module 21 either by converting the energy to AC or DC power, or alternatively, by additional power connectors and flexible lines.

Alternatively if it is desired to use our device 10 to power a multi-power source adapter directly insertable into a battery powered tool, the alternate multi-power source adapter 39 is connectable to either AC cord plug 11 or DC cord plug 12 as shown in FIG. 2. Other power sources can be fed to adapter 39 either by converting the energy to AC or DC power, or alternatively, by additional power connectors and flexible lines. Adapter 39 is sized to fit into the recess in the tool normally filled by its power pack, and has a recess sized to accept a battery pack or multi-functional battery module.

Figure 3:
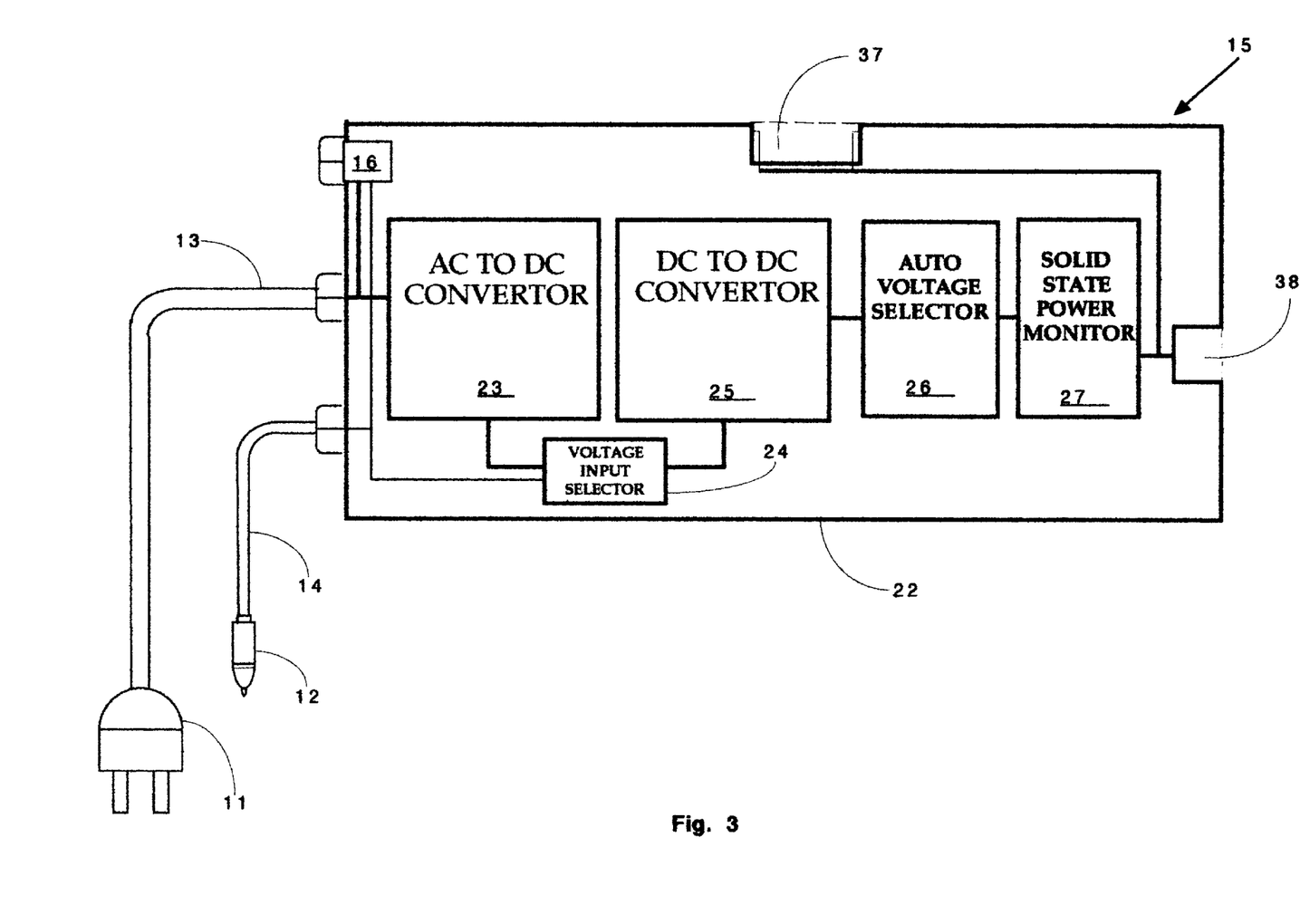
FIG. 3 is a pictorial description of a preferred embodiment of the multi-functional power block.

The major components of multi-functional power block 15 are contained within a housing 22 as shown in FIG. 3. If power block 15 is powered by alternating current, the current flowing from AC plug 11 and flexible line 13 flows through fuse block 16 into AC to DC converter 23 and converted into DC power transmitted by voltage input selector 24 to DC to DC converter 25. If instead the power block is powered by direct current, the current flowing from DC connector 12 and flexible line 14 flows through fuse block 16 and is transmitted by voltage input selector 24 to DC to DC converter 25. The resulting power is transmitted to auto voltage selector 26 and thence to solid state power monitor 27. The resulting DC power flows to battery recess 37 and to DC socket 38 as shown in FIG. 3

Figure 4:
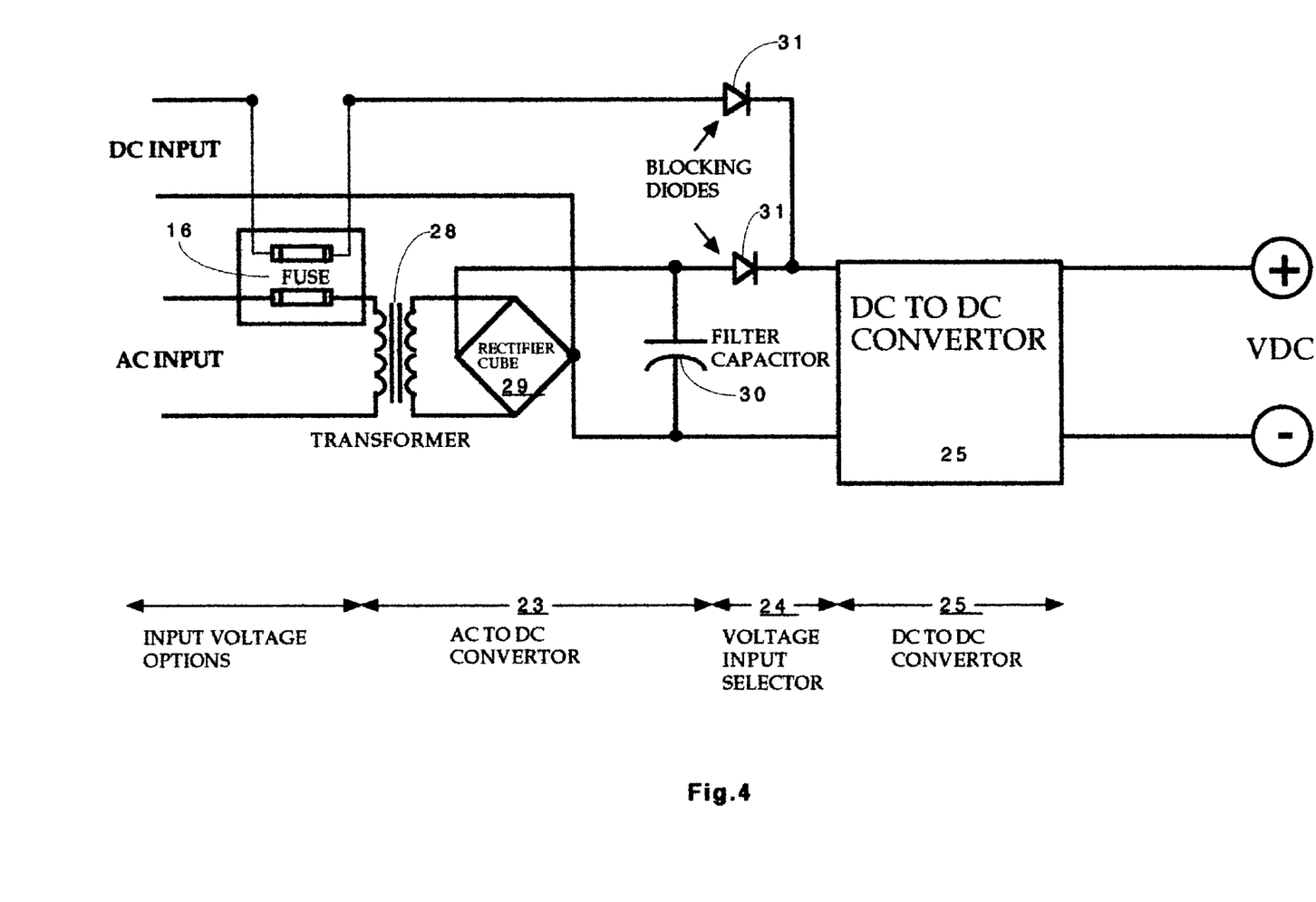
FIG. 4 is a circuit diagram of a preferred embodiment of the multi-functional power block except for the auto voltage and solid state power monitor.

FIG. 4 is a circuit diagram of the AC to DC converter 23, the voltage input selector 24 and the DC to DC converter 25 shown in FIG. 3. The AC input line includes a fuse 16 and a transformer 28 and is converted into direct current by rectifier cube 29 and its voltage determined by filter capacitor 30 and fed to blocking diode 31. DC input passes through a fuse 16 and is fed to blocking diode 31. The resulting DC power with its determined voltage flows into DC to DC converter 25 and the voltage is stepped up or down and then transmitted to auto voltage selector 26.

Figure 5:
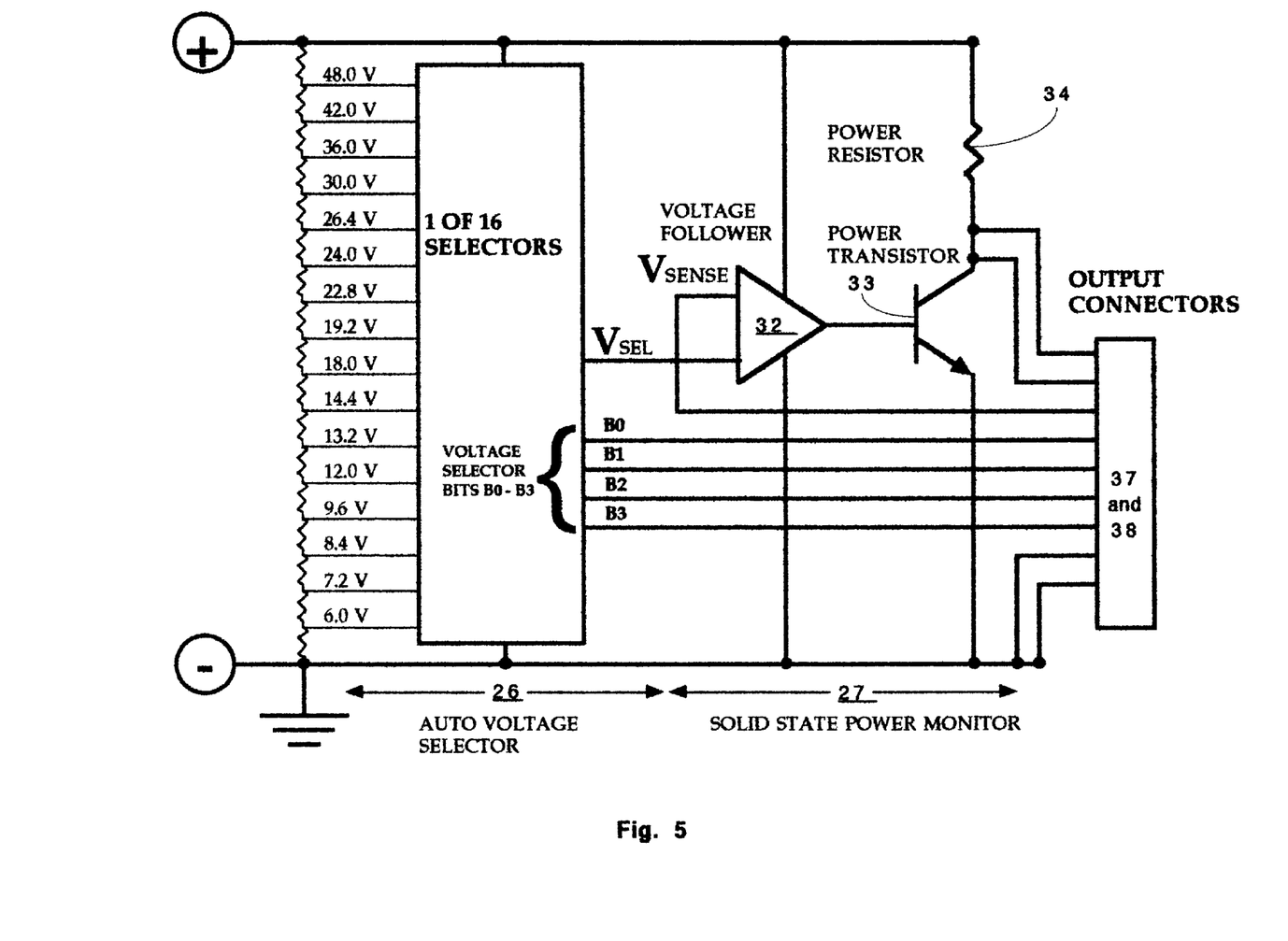
FIG. 5 is a circuit diagram of a preferred embodiment of the auto voltage and solid state power monitor.

Auto voltage selector 26 as shown in FIG. 5 delivers a precision reference voltage Vsel to the solid state power monitor 27. The four selector bits B0, B1, B2 and B3 are hard wired on the multi-functional battery module 19, 20 and 21 and adapter 36 to be used by the normally battery powered tool. These four bits, representing sixteen combinations of binary 1's and 0's, are input to the 1 of 16 selectors which then selects the proper reference voltage from the power resistor 34 divider network and outputs this voltage as Vsel.

Voltage follower 32, power transistor 33 and power resistor 34 work together as a generic power voltage regulator circuit to deliver constant rated voltage, with overcurrent limit protection at the junction of the power resistor 34 and the power transistor 33. The power transistor 33 is biased by the voltage follower 32 based on the reference voltage Vsel and the feedback voltage Vsense, which measures the actual voltage delivered to the output connectors.

Figure 6:
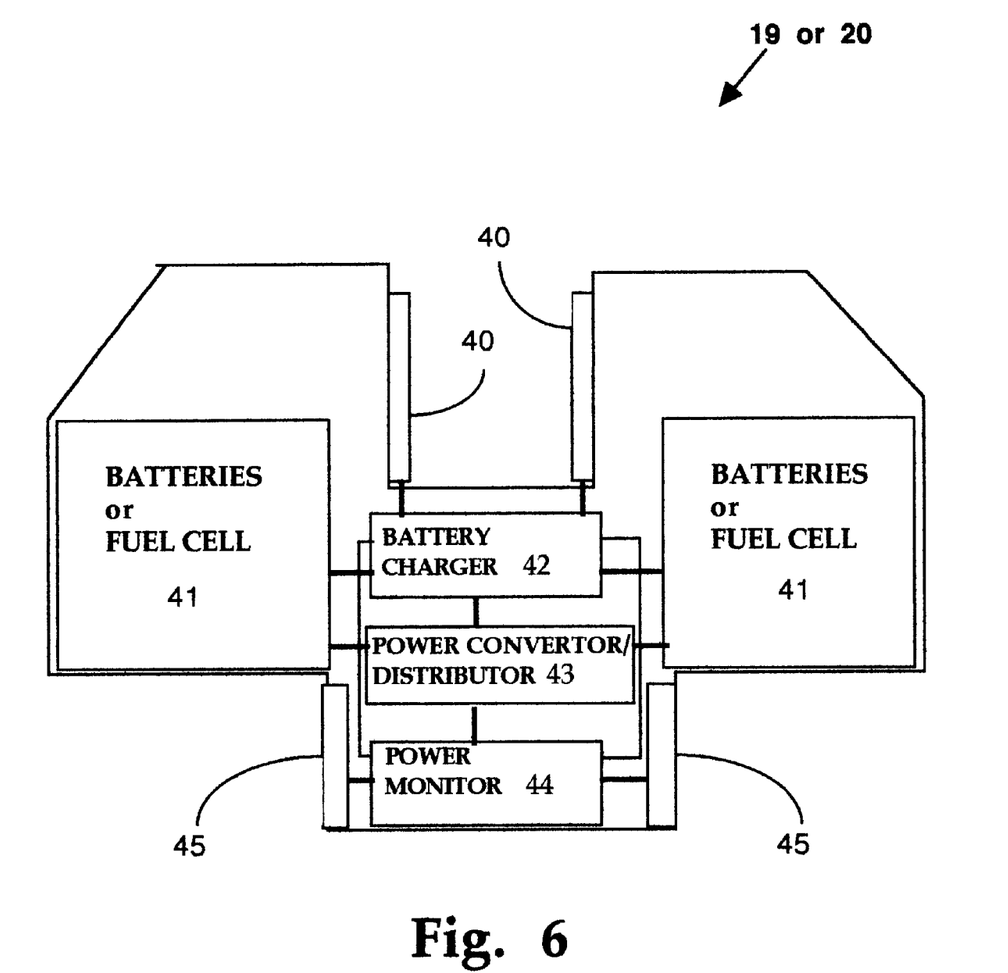
FIG. 6 is a pictorial description of a preferred embodiment of the multi-functional battery module including one or a combination of battery unit and fuel cell unit which provide complementary power to the tool through reduced sized power transmission cable.

FIG. 6 shows a pictorial description of a preferred embodiment of the multifunctional battery module 19 including battery unit 41 consisting of one or a combination of battery and fuel cell units which individually or together provide complementary power to the tool. When multifunctional battery module 19 or 20 or 21 is used, the size of cable 17 is significantly reduced since significant portion of the peak current is provided directly to the tool by said multi-functional battery module 19 using connectors 45. The multifunctional battery module as illustrated in FIG. 6 receives power either from the multi-functional power block via connector 40 or connector 45. Power received via connector 40 is fed to battery charger 42, which charges the batteries 41, and then to power distributor 43 and power monitor 44. Power monitor 44 monitors the power demand of the tool and power distributor 43 delivers the required power to the tool via connector 45 from a combination of fuel cell and battery power and power received via connector 40. Therefore, multifunctional battery module 19 or 20 or 21 is utilized to provide complementary power to the tool by means of direct connection to the tool by mechanical and electrical connections or by means of direct electrical and mechanical connections to multifunctional power block 15. Multifunctional battery module 19 or 20 or 21 can also be connected to any battery charger and power converter which accepts batteries for recharge using the recess available in said battery charger or power converter for powering insertable battery powered tools using cable 17. Multifunctional battery module 19 or 20 or 21 includes optional power convertor to work with a built-in battery or fuel cell.

Alternately if the multi-functional battery module receives power via connector 45, this power is transmitted via power monitor 44 to battery charger 42, which charges the batteries 41. Power from the batteries 41 is delivered to the tool via power distributor 43 to power monitor 44 and then to connector 45 as required so the tool can produce the required operational driving torque.

While we have shown and described a preferred form of our invention, the scope of our invention is in no way limited to what has been shown and described. The scope of our invention is defined only by the appended claims.

We claim:

1. A method of providing either AC or DC power for an electrically powered tool having a motor designed to be powered by an insertable battery which fits into a recess in the tool comprising
    providing a multi-functional power block capable of being powered either by AC mains or DC power,
    the multi-functional power block including an AC to DC, a DC to DC convertor, a solid state power monitor which detects the voltage and current used by the tool motor so that the multi-functional power block can automatically set the voltage and current to be delivered to the tool's motor at the voltage and current required to produce the tool motor's full rated driving torque, and a battery charger capable of recharging an insertable battery or multi-functional battery module which fits into a recess in the multi-functional power block,
    providing an AC mains plug and a flexible line running from the AC mains plug to the multi-functional power block,
    providing a first DC plug and a flexible line running from the first DC plug to the multi-functional power block,
    providing a flexible line running from the multi-functional power block to a second male DC plug, and
    providing a DC power connector designed to receive the second male DC plug and to fit into the empty recess in the electrically powered tool which recess normally receives the batteries which power the tool.

2. A method as set forth in claim 1 in which the multi-functional power block includes a solid state power monitor which detects the voltage and current used by the tool motor so that the multi-functional power block can automatically set the voltage and current to either (a) be delivered to the tool's motor at the voltage and current required to produce the tool motor's full rated driving torque or (b) recharge the insertable multi-functional battery module which fits into a recess in the tool, and
    providing a said multi-functional battery module designed to receive the second male DC plug and to fit into the empty recess in the electrically powered tool which recess normally receives the batteries which power the tool.

3. A method as set forth in claim 1 in which the multi-functional battery module includes a battery and a battery charger, which receives energy from the multi-functional power block, to recharge the said battery.

4. A method as set forth in claim 1 in which the said multi-functional battery module including a battery, a battery charger, a power distributor, and a monitor which detects operation of the tool's motor so that the said power distributor can automatically deliver the required voltage and current to the tool's motor from one or a combination of said battery power and said multi-functional power block to produce the required operational driving torque.

5. A method for providing one or a combination of mechanical and electrical adapters for the charging recess in the multi-functional power block and the tool recess in order to accept different sizes and shapes of said battery packs or said multi-functional battery modules.

6. Apparatus for use with tools powered by insertable batteries comprising
    a multi-functional battery module identical in shape to the insertable battery of a tool which is insertable into the empty recess in the tool normally occupied by the insertable battery,
    a universal male plug connected to said multi-functional battery module,
    an AC-DC multi-functional power block designed to deliver power to the tool's motor at its rated current and voltage by connection to the universal male plug, and recharge an insertable battery which fits into a recess in the tool and in the multifnctional power block and a power source connected to the AC-DC multi-functional power block.

7. Apparatus as set forth in claim 6 in which for use with tools powered by insertable batteries comprising
    a multi-functional battery module identical in shape to the insertable battery of a tool which is insertable into the empty recess in the tool normally occupied by the insertable battery,
    a universal male plug connected to said multi-functional battery module,
    an AC-DC multi-functional power block designed to deliver power to the tool's motor at its rated current and voltage by connection to the universal male plug, and recharge the said insertable multi-functional battery module which fits into a recess in the tool, and
    a power source connected to the AC-DC multi-functional power block.

8. Apparatus as set forth in claim 6 in which for use with tools powered by insertable batteries comprising
- a multi-functional battery module identical in shape to the insertable battery of a tool which is insertable into the empty recess in the tool normally occupied by the insertable battery designed to deliver power to the tool's motor from one or a combination of battery power and multi-functional power block,
- a universal male plug connected to said multi-functional battery module
- said AC-DC multi-functional power block designed to deliver power to the said insertable multi-functional battery module which fits into a recess in the multi-functional power block, and
- a power source connected to the AC-DC multi-functional power block.

9. Apparatus as set forth in claim 6 in which for use with tools powered by insertable batteries comprising
- an adapter module which is identical in shape to the insertable battery of a tool which is insertable into the empty recess in the tool normally occupied by the insertable battery, which is designed to receive mechanically and a said battery pack or a said multi-functional battery module.

* * * * *